C. W. SVENSON.
FREE WHEEL DEVICE.
APPLICATION FILED FEB. 14, 1919.

1,330,407.

Patented Feb. 10, 1920.
2 SHEETS—SHEET 1.

INVENTOR
C. W. Svenson
BY
Bartlett + *(illegible)*
ATTORNEYS

C. W. SVENSON.
FREE WHEEL DEVICE.
APPLICATION FILED FEB. 14, 1919.

1,330,407.

Patented Feb. 10, 1920.
2 SHEETS—SHEET 2.

INVENTOR
C.W. Svenson
BY
Bartlett & Brownell
ATTORNEYS

UNITED STATES PATENT OFFICE.

CHARLES W. SVENSON, OF NEW BRITAIN, CONNECTICUT, ASSIGNOR TO THE AMERICAN HARDWARE CORPORATION, OF NEW BRITAIN, CONNECTICUT, A CORPORATION OF CONNECTICUT.

FREE-WHEEL DEVICE.

1,330,407.   Specification of Letters Patent.   Patented Feb. 10, 1920.

Application filed February 14, 1919. Serial No. 276,976.

*To all whom it may concern:*

Be it known that I, CHARLES W. SVENSON, a citizen of the United States, residing at New Britain, county of Hartford, State of Connecticut, have invented a certain new and useful Improvement in Free-Wheel Devices, of which the following is a full, clear, and exact description.

My invention relates to free wheel devices for motor cycles and other vehicles and has for its object to produce a free wheel device having few parts, in which the balls forming the ball bearing for the sprocket member are located directly in the plane of the sprocket teeth of the sprocket wheel, so that there is no wear from pulling sidewise. It further has for its object to provide a device in which when in operation lateral pressure is exerted, tending to keep the clutch tight at all times. It further has for its object to provide a device in which the pawls act independently of each other. It further has for its object to make a device which is efficient in operation and simple to manufacture.

The following is a description of an embodiment of my invention, reference being had to the accompanying drawings, in which, Figure 1 shows one end elevation;

Figure 1:
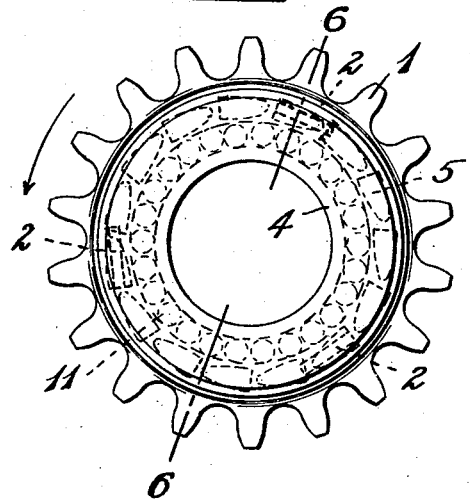
Figure 2:
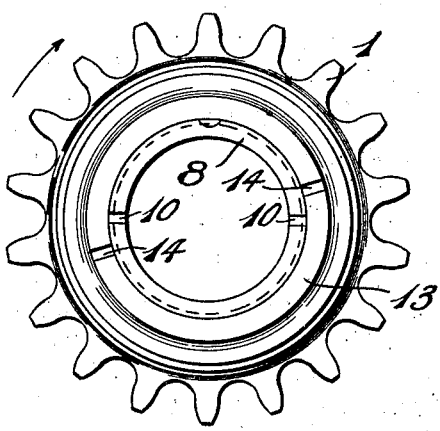
Fig. 2 shows the other end elevation.
Figure 3:
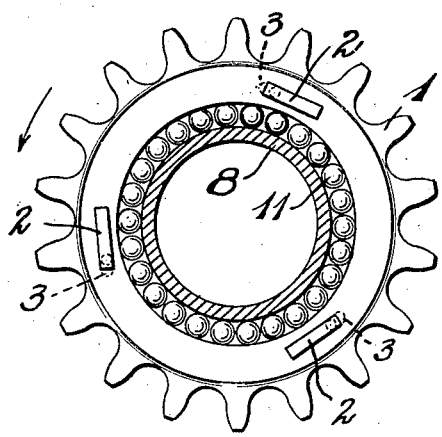
Fig. 3 shows a section on the line 3—3, Fig. 6.
Figure 4:
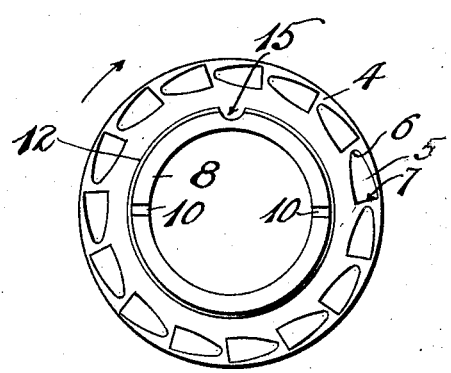
Fig. 4 shows in detail a side elevation of the ratchet member.
Figure 5:
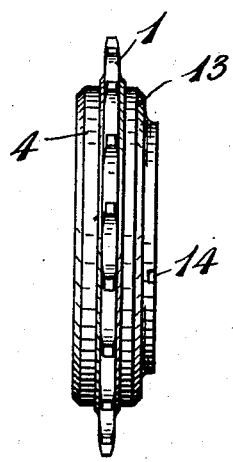
Fig. 5 shows a side elevation.
Figure 6:
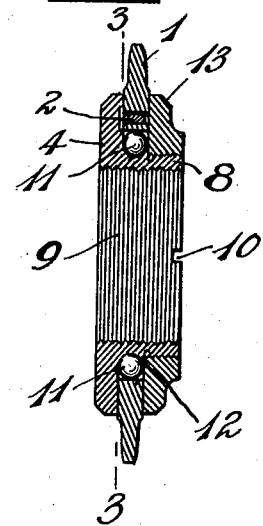
Fig. 6 shows a section on the line 6—6, Fig. 1.
Figure 7:
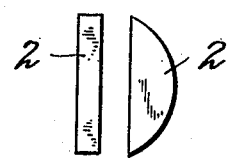
Fig. 7 shows in detail a front and side elevation of one of the pawls.
Figure 8:
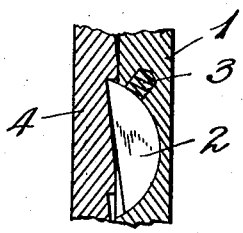
Figs. 8 and 9 show sectional views showing one of the pawls in the sprocket member in different positions with relation to the ratchet member.
Figure 9:
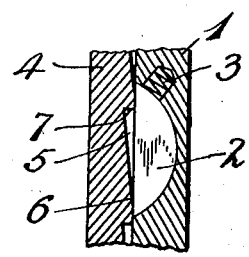

Referring more particularly to the drawings, 1 is a sprocket member or wheel provided with sprocket teeth and having three equally spaced recesses of uniform width and in the form of segments of cylinders whose axes are on radial lines perpendicular to the axis of the sprocket member containing respectively three equally spaced pawls 2—2—2 composed of flat pieces of steel of uniform thickness throughout and also having the form of segments of cylinders whose radii are slightly less than the radii of the recesses so as to fit the recesses, said pawls having their forward ends pressed outwardly by springs 3—3—3 located in cylindrical recesses. These pawls are nearly half rounds and the recesses containing them are correspondingly shaped so that the pawls easily turn therein. 4 is a disk portion of a ratchet member having fifteen equally spaced recesses 5 sloping from the ends 6 and ending abruptly at 7 so as to form teeth arranged in equally spaced triplicates so as to be engaged simultaneously by the forward ends of the three pawls 2. The ratchet member also has a sleeve portion 8 internally screw-threaded at 9 and having its outer end externally screw-threaded with a right hand thread. It is provided with notches 10 for a spanner wrench. 11 is a series of balls in a raceway formed at the base of the sleeve, there being a shoulder 12 formed at the outer edge of the race. The interior of the sprocket member constitutes a raceway with a rectilineal face engaging the balls 11. The races and balls lie in a plane passing through the medial plane of the sprocket teeth so that the thrust when in operation is directly in line with the plane passing through the centers of the balls and races, resulting in the absence of side pull. The pawls 2 also have portions extending into said plane. 13 is a nut having an internal right headed screw-thread engaging the external screw-thread of the sleeve 8 and hard up against the shoulder 12. The space between the nut and the disk portion of the ratchet member is just sufficient to permit the sprocket member to move easily therein. 14—14 are spanner notches in the nut. The sprocket when moving into locked position is turned in the direction of the arrow (Fig. 1). The pawls when engaging force the sprocket 1 toward the nut 13 and the nut having a right handed thread this action tends to keep the nut tight against the shoulder 12. This shoulder acts to limit the inward movement of the nut and to properly space it from the disk portion of the ratchet member so as to properly hold the sprocket and permit it to turn. There are three pawls which are spaced apart 120 degrees, thus making a three-point engagement and consequent balanced three-point lateral thrust. 15 is a recess through which the balls are inserted when the sprocket member is in place upon the sleeve.

The device is simple in construction and inexpensive to manufacture. It is also efficient in operation. When the sprocket is stationary, the ratchet member is free to turn in a forward direction. When the sprocket is revolved in the direction of the arrow (Fig. 1) it carries the ratchet member along with it by reason of the engagement of the pawls 2 under the action of the springs 3.

As will be evident to those skilled in the art, my invention permits of various modifications without departing from the spirit thereof or the scope of the appended claims.

What I claim is:

1. In a free wheel device, in combination two adjacent wheel members, one mounted upon the other and adapted to rotate relatively thereto and constituting a sprocket wheel, one of said members having ratchet teeth upon the side next to the other member and the other member having in its opposing side a series of recesses in the form of segments of cylinders whose axes are perpendicular to the axis of said sprocket wheel, pawls in said recesses, said pawls being in the form of cylindrical segments free to move in said recesses, and means for causing said pawls to move into engagement with said ratchet wheel when the sprocket wheel is turned in one direction and to allow said pawls to be disengaged from said ratchet wheel when said sprocket wheel is turned in the other direction.

2. In a free wheel device, in combination two wheel members, one mounted upon the other and adapted to rotate relatively thereto and constituting a sprocket wheel, said sprocket wheel having ratchet teeth upon the side next to the other member and the other member having in its adjacent side a series of recesses in the form of segments of cylinders whose axes are perpendicular to the axis of said sprocket wheel, pawls in said recesses, said pawls being in the form of cylindrical segments free to move in said recesses, and means for causing said pawls to move into engagement with said ratchet wheel when the sprocket wheel is turned in one direction and to allow said pawls to be disengaged from said ratchet wheel when said sprocket wheel is turned in the other direction.

3. In a free wheel device, in combination two wheel members, one mounted upon the other and adapted to rotate relatively thereto and constituting a sprocket wheel, one of said members having ratchet teeth upon the side next to the other member and the other member having in its adjacent side a series of recesses in the form of segments of cylinders whose axes are perpendicular to the axis of said sprocket wheel, pawls in said recesses, said pawls being in the form of cylindrical segments free to move therein, means for causing said pawls to move into engagement with said ratchet wheel when the sprocket wheel is turned in one direction and to allow said pawls to be disengaged from said ratchet wheel when said sprocket wheel is turned in the other direction, and ball bearings interposed between said two members and lying in the plane of the teeth of the sprocket wheel.

CHARLES W. SVENSON.